US007206286B2

(12) United States Patent
Abraham et al.

(10) Patent No.: US 7,206,286 B2
(45) Date of Patent: Apr. 17, 2007

(54) DYNAMIC DCH ALLOCATION METHODOLOGY FOR PACKET DATA SERVICES IN A WIRELESS COMMUNICATIONS SYSTEM

(75) Inventors: Santosh P Abraham, Keasbey, NJ (US); Ching-Roung Chou, Naperville, IL (US); Mooi Choo Chuah, Marlboro, NJ (US); Philip Charles Sapiano, Corsham (GB); Steven E. Sommars, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1034 days.

(21) Appl. No.: 10/202,271

(22) Filed: Jul. 24, 2002

(65) Prior Publication Data
US 2004/0017795 A1 Jan. 29, 2004

(51) Int. Cl.
*H04J 1/16* (2006.01)
(52) U.S. Cl. .................... 370/235; 370/395.41
(58) Field of Classification Search ................ 370/329, 370/349, 333, 352, 450, 466, 437, 235, 238, 370/464, 441–445, 232, 389, 229, 395.41, 370/431
See application file for complete search history.

(56) References Cited
U.S. PATENT DOCUMENTS
6,347,091 B1 * 2/2002 Wallentin et al. ........... 370/437
6,978,143 B1 * 12/2005 Vialen ...................... 455/452.2
2004/0097191 A1 * 5/2004 Meyer et al. ............... 455/11.1
2005/0063304 A1 * 3/2005 Sillasto et al. ............. 370/229
* cited by examiner

*Primary Examiner*—Brenda Pham
(74) *Attorney, Agent, or Firm*—Matthew J. Hodulik

(57) ABSTRACT

In a UMTS network, each packet data service user requires a dedicated channel (DCH) to transmit at high data rates. However, the number of DCHs available is small due to code and power limitations. Thus many users will have to be allocated the same DCH on a time sharing basis. Such sharing will not impact the quality of service for users whose applications are not delay sensitive and whose traffic generation pattern toggles between transmit and idle states. Such applications include web browsing, FTP sessions and E-mail. The present invention discloses four algorithms that can be used to dynamically allocate DCH channels to a contending user based on the user's need according to its traffic generation. One embodiment of the invention discloses a methodology of allocating user channels for packet data services in a wireless communications network, a first type channel having a given data rate and a second type channel having a lower data rate, including the steps of determining an estimated bandwidth requirement for the packet data services, switching a user to the second channel type from said first channel type if said estimated bandwidth requirement is below a first threshold, and switching a user to the first channel type from said second channel type if the estimated bandwidth requirement is greater than a second threshold. Another embodiment discloses methodology of allocating user channels for packet data services in a wireless communications network, a first type channel having a given data rate and a second type channel having a lower data rate, comprising the steps of providing an inactivity timer per user, and switching from the first channel type to said second channel type depending on a state of said inactivity timer.

12 Claims, 6 Drawing Sheets

USER STATE TRANSITION DIAGRAM IN UMTS

USER STATE TRANSITION DIAGRAM IN UMTS

FLOW CHART OF EVENTS IN A WEB BROWSING SESSION

ANALYTICAL MODEL FOR NETWORK SYSTEM

A PLOT THE TIME TAKEN TO OBTAIN A DCH
AFTER THE USER ENTERS THE DCH QUEUE.

PLOT OF NUMBER OF USERS SOJOURNING IN THE SYSTEM (N)

JOINT LOR,LOC DISTRIBUTION

DISTRIBUTION OF OBJECT SIZES

ILLUSTRATES DCH HOLDING TIME STATISTICS

EVOLUTION OF THE NUMBER OF SOJOURNING USERS
FOR ARRIVAL RATE OF 0.05

DYNAMIC DCH ALLOCATION METHODOLOGY FOR PACKET DATA SERVICES IN A WIRELESS COMMUNICATIONS SYSTEM

FIELD OF THE INVENTION

The present invention relates generally to wireless communications systems and, more particularly, methods for controlling user state transitions for wireless users.

BACKGROUND OF THE INVENTION

Packet data service users in a UMTS network must be in the Cell_DCH (dedicated channel) or Cell_FACH (forward access channel) state to transmit data. In the Cell_DCH state, the user is provided with a dedicated channel (DCH) with a fixed data rate. In the Cell_FACH state the user shares the forward access channel (FACH) with other users. The data rate available to a user in the Cell_DCH is much higher than that available in the Cell_FACH state. However, due to limitations in the number of available orthogonal codes and transmit power, the number of users can that be kept in Cell_DCH state is limited. This number depends on the data rate per user. For example, if all users require 384 Kb/s then only 7 codes are available per sector, and thus a maximum of 7 users can be kept in the Cell_DCH state.

Applications such as e-mail and web browsing are carried over packet data services in UMTS. These applications have relaxed delay requirements. The relaxed delay requirement is due to the non-real time nature of the content and the fact that most users will tolerate a few seconds of delay for the download of a web page or email. Hence a few 100 s of ms of delay to obtaining a DCH may be tolerable. In addition, data streams produced by these applications are not continuous. They consist of bursts of data (of varying sizes) followed by relatively large idle times that are usually of the order of seconds.

These two properties i.e., relaxed delay requirements and a non-contiguous data stream, can be exploited to share the limited pool of DCHs among a large number of users. Since users are idle for several seconds, they may be switched out of the DCH mode during their idle periods. This switching would not affect the quality perceived by the user, as long as the user receives a DCH when it is ready for the next burst of data. The released DCH could be used to serve another user. A method of dynamic allocation of DCHs depending on need would allow many more users of data services to be admitted into the UMTS network while guaranteeing reasonable quality of service to all of them.

SUMMARY OF THE INVENTION

In a UMTS network, each packet data service user requires a dedicated channel (DCH) to transmit at high data rates. However, the number of DCHs available is small due to code and power limitations. Thus many users will have to be allocated the same DCH on a time sharing basis. Such sharing will not impact the quality of service for users whose applications are not delay sensitive and whose traffic generation pattern toggles between transmit and idle states. Such applications include web browsing, FTP sessions and E-mail. The present invention discloses a number of methodologies that can be used to dynamically allocate DCH channels to a contending user based on the user's need according to its traffic generation pattern.

One embodiment of the invention discloses a methodology of allocating user channels for packet data services in a wireless communications network, a first type channel having a given data rate and a second type channel having a lower data rate, including the steps of determining an estimated bandwidth requirement for the packet data services, switching a user to the second channel type from said first channel type if said estimated bandwidth requirement is below a first threshold, and switching a user to the first channel type from said second channel type if the estimated bandwidth requirement is greater than a second threshold.

Another embodiment discloses methodology of allocating user channels for packet data services in a wireless communications network, a first type channel having a given data rate and a second type channel having a lower data rate, comprising the steps of providing an inactivity timer per user, and switching from the first channel type to said second channel type depending on a state of said inactivity timer.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 9 is a plot of the evolution of sojourning users for a given arrival rate.

DETAILED DESCRIPTION

Although the present invention is described with respect to UMTS wireless communication systems, it would be understood the invention is also applicable to other types of communications systems including 3G1X and the like. Prior to introducing the invention, a brief discussion regarding the states of a packet service user in a UMTS networks is presented.

Figure 1:
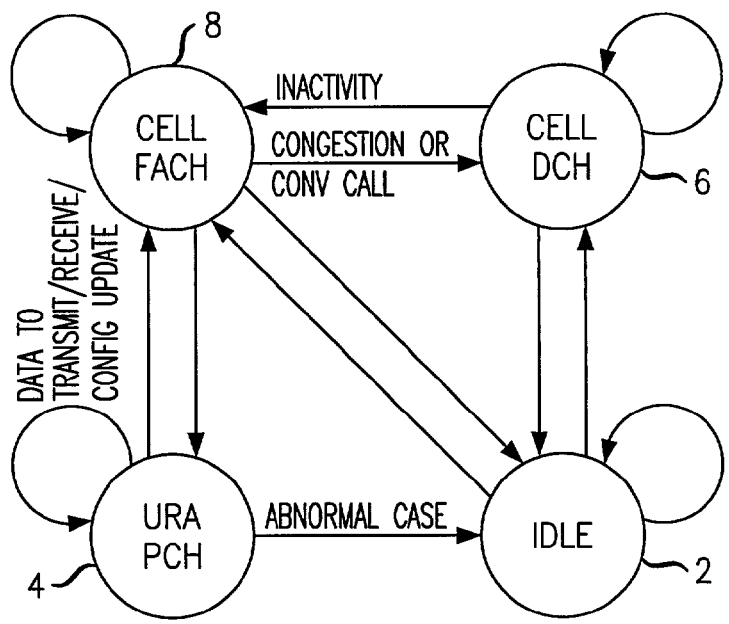
FIG. 1 is a user state transition diagram for UMTS packet services.

Referring to FIG. 1, a state transition diagram is shown for a packet service user in a UMTS network. As shown, one state in the diagram is the state (2) Idle: A UE begins in the idle mode after being switched on. In the idle mode it selects the PLMN that it wants to associate with and is capable of listening on the broadcast channel. However, RRC functions have not been carried out that would enable it to transmit on the RACH or DCH. Another state (4) is URA_PCH: In this state the user is listening on the paging channel. It does not have permission to use the RACH or the FACH. The UE can act on RRC messages received on the PCCH.

State (6) reflects Cell_FACH: In this state the user has access to the common channels such as the forward access channel (FACH) and the reverse access channel (RACH). The FACH is used for downlink transmission, while the RACH is used for unlink access. The FACH has to be shared among other users in the same state. The exact mechanism for choosing which user's packet is to be sent at a particular time is not clearly known. A scheme such as round robin may be employed among the users in the FACH state. Users that require unlink access need to contend for bandwidth on the RACH.

State (8) is Cell_DCH: In the Cell_DCH state, a user has access to a dedicated channel. A dedicated channel provides a user with a fixed data rate for transmission. Typical data rates available on the dedicated channel are 64 kb/s, 128 kb/s, 384 kb/s. The amount of bandwidth on the DCH may be changed to accommodate fluctuations in power required (due to fading/noise conditions). It is preferable for a user to be in the Cell_DCH state when transferring a large amount of data, for example, during the download of a web page.

Transitioning a user from or to each of the above four states involves exchange of control messages on the control channel. The UE transitions out of the idle state to the Cell_DCH state or Cell_FACH state. This transition from the idle state is always initiated by an RRC connection request. This step involves setting up the necessary radio access bearers (RABs). Transitions from the Cell_FACH/Cell_DCH state to the URA_PCH state involves tearing down radio access bearers that have been allocated. A transition from the Cell_DCH to Cell_FACH involves withdrawing the power and code allocated.

Transitions between states are operations that are both communication and processor intensive. Hence, excessive transitions would result in severe degradation of overall system performance. A method that is in accordance with the invention for limiting the number of transitions is to mandate that a user remain in a given state for a minimum amount of time before being allowed to transition to another state.

A first methodology for providing dynamic allocation or DCHs among users in a wireless network, e.g., a UMTS network in accordance with the invention is a Fixed Inactivity Timer (FIT) Algorithm. To implement the Fixed Inactivity Timer Algorithm, each user requires an inactivity timer, e.g., a counter implemented in connection with a processor in the radio network controller (RNC). When a user is in the Cell_DCH state and the user's transmit or receive buffer level drops to zero, the inactivity timer is started. The inactivity timer is reset to zero if new packets are received at the RNC for downlink transmission, or if new uplink packets are received. When the recorded time on the inactivity timer exceeds a certain preset threshold, procedures for releasing the DCH are initiated. The user is transitioned into the Cell_FACH state. The freed DCH can be allocated to another user.

There are both advantages and disadvantages to the choice of high or low inactivity timer thresholds. A high value will induce less frequent switches between the Cell_DCH and Cell_FACH state and thus require smaller signaling bandwidth and processing capacity. However a high value can cause poor utilization of DCH bandwidth. A low value of the inactivity timer could cause unnecessary switches between Cell_FACH and Cell_DCH and thus be a drain on the system processing capacity and UE power. However utilization of the DCH can be better with a low inactivity timer threshold.

A second embodiment of the invention is the Least Recently User (LRU) Algorithm. As in the case of the fixed inactivity timer algorithm, the LRU algorithm also uses an inactivity timer for each user. However, there is no preset threshold for switching the user. Instead, a user is allowed to remain in the Cell_DCH state in the absence of uplink or downlink transmission, as long as there are no other users requiring a DCH.

When another user requires DCH bandwidth, the inactivity timer of all users in Cell_DCH are scanned. The user that has the highest inactivity timer value is switched to the Cell_FACH state. The freed DCH is allocated to the user that requires it.

Another embodiment of the invention combines techniques from both the FIT and LRU algorithms. The FIT and LRU algorithm both require the use of an inactivity timer. The two approaches can be combined. The combination could overcome some of the potential problems with either approach. The combination algorithm would work as follows. When the inactivity timer has exceeded a certain preset threshold, the user is moved to Cell_FACH state. The LRU procedure is used to choose users if there is no user whose inactive timers has expired.

Another embodiment of the invention for providing dynamic allocation or DCHs among users in a wireless network is an Adaptive Algorithm.

In order to describe the algorithm, it is helpful to define the following terms:
  n: The index on the algorithm updates
  un: Number of uplink RLC PDU arrivals between update n and n+1
  dn: Number of downlink RLC PDU arrivals between update n and n+1
  qn: Queue length of RLC buffer (in terms of RLC PDUs) at the $n^{th}$ update epoch The adaptive DCH allocation algorithm of the invention can then be described as follows. At update epoch n+1 do the following:

1. Compute an approximation of the sum of required uplink and downlink data rates $$x_{n+1}=u_n+d_n+q_n$$

2. Compute the Estimated Bandwidth Requirement $$y_{n+1}=ay_n+(1-a)x_{n+1};\ a<1\ \text{(where a is a tuning parameter which indicates emphasis on past history)}$$

3. if ($y_{n+1}$ < a && user_state = Cell_DCH)
    Switch user to FACH state
   else if ($y_{n+1}$ > β && user_state = Cell_FACH && DCH available)
    Switch user to DCH state.

Note that $d_n+q_n$ is a measure of downlink data rate required in the $n^{th}$ interval and $u_n$ is a measure of uplink rate. The parameter $x_n$ is an approximation of the sum of required uplink and downlink data rates. If a user is in Cell_FACH and has a high value $x_n$ then a DCH may be needed. In order to avoid over-reacting to sudden changes in $x_n$ a "low pass" filtered version of $x_n$, i.e., $y_n$ is used in making the switching decision. Criterion to be used for selecting the parameters a, α, β are discussed herein.

Neither the RLC buffer level nor the downlink arrival rate taken alone are sufficient for the efficient operation of the algorithm. Note that the buffer level remains low as long as user arrival rate is sufficiently less than the transmission rate.

Thus a user could be switched from Cell_DCH to Cell_FACH during its page download phase if switching decisions were made purely based on queue lengths. Using only downlink arrival rate can be problematic due to TCP. Since TCP has a slow start process, the arrival rate at the beginning of a download can be small. Hence using measurements of arrival rate only may lead to large delays in detecting the beginning of a page download, thus adversely affecting user perceived page download time.

One approach is that the user RLC buffer level and downlink arrival rate should be filtered separately. This approach requires two concurrently running filters, each with its' own set of filter coefficients. Each of the filters would also require its own set of thresholds. However, the metric chosen here nicely combines queue length and data rate thus requiring a single filtering operation and a single set of thresholds. Thus, it is believed that the single filtering approach will be simpler to implement and will be computationally less expensive.

Simulation Model

In accordance with the present invention, a simulation model was used in order to test and compare the described algorithms.

Figure 2:
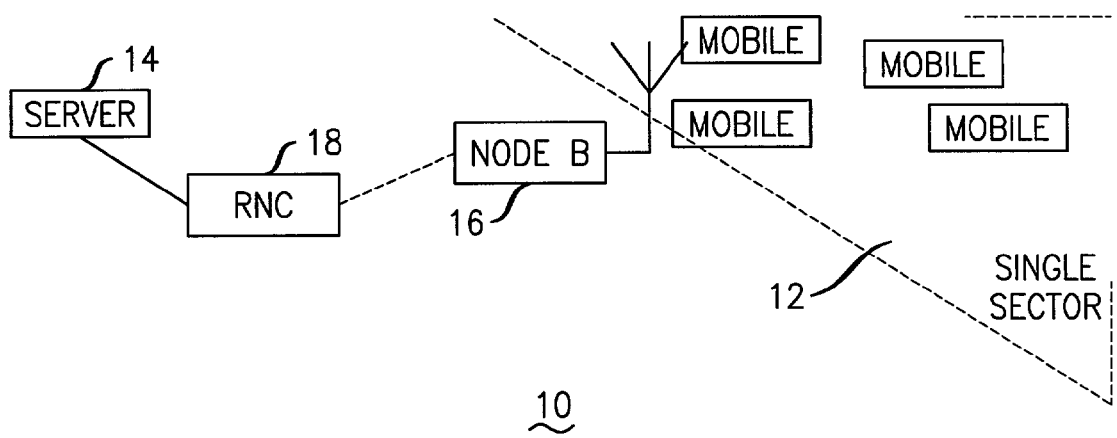
FIG. 2 is an exemplary wireless network model.

FIG. 2 shows an exemplary network model 10 used for the comparison. As shown, a single sector 12 of a cell is considered. Users arrive into the sector according to a Poisson process and communicate to a server 14 via a wireless node 16 and a radio network controller 18. Each user executes one web browsing session. A web browsing session consists of downloading several pages. At the completion of a session, the user departs. The permitted user data rates over the airlink are 384 Kb/s, 128 Kb/s, 64 Kb/s.

Figure 3:
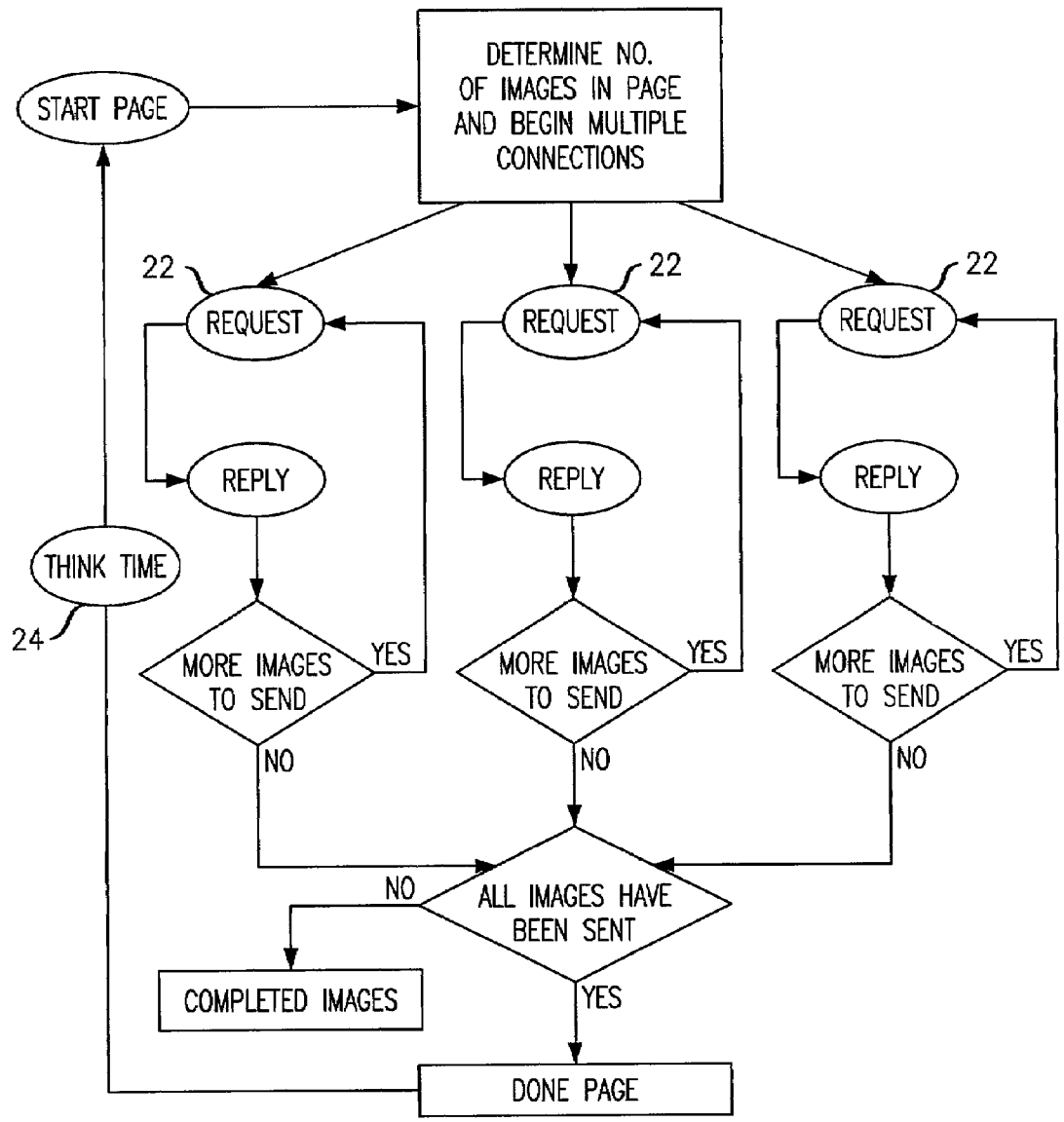
FIG. 3 is an exemplary flowchart for a web browsing session.

The sequence of events in a web browsing session is illustrated in the flow chart 20 given in FIG. 3. A user initiates the download of a page by sending a request 22. The response to this request is generally an html or java script file that contains requests for several objects that make up the page. For example, consider browsing through "cnn.com".

The first file downloaded consists of text, some HTML code and some Java script. The execution of the HTML code and Java scrip initiates the download of other objects such as pictures, flash media files, advertisements etc.

Once the objects of a page are completely received, the user moves into the think time 24 where no traffic generated. The download of the next page begins after the think time elapses. In our study we assume that user cycles through this download-thinktime sequence of random but finite number of times. The statistics of the web browsing session are given in Table 1.

An analytical model was also developed to estimate page download delays and the number of sojourning users. In order to elaborate on the model, the following are defined.

Define:
$\lambda_t$=1/Think Time
$\lambda_a$=New user arrival rate
$\mu_s$=System Page service rate per DCH: Maximum rate at which pages are served completely at a DCH
k=No. of DCH available
N=Mean number of users in the system
n=Mean number of pages per user: Number of pages a user downloads before leaving the system
p=1−1/n
T=Mean sojourn time of a user in the system: Amount of time the user spends in the system before all pages are down loaded.

$d_p$=Page service delay: Amount of time taken to completely download a page

A simple condition for stability can be obtained by viewing the UMTS network as a system that receives work in terms of pages, serves the pages and releases the user. The necessary and sufficient condition for stability is that the page input rate should not exceed the maximum possible page departure rate. Using the above notation, this is expressed as $$n\lambda_A < k\mu_s$$

Large arrival rates that satisfy the above stability condition may lead to the accumulation of a large number of users in the system and excessive delays. In order to obtain the statistics of the number of users in the system and page download delay we use the model 30 shown in FIG. 4.

Figure 4:
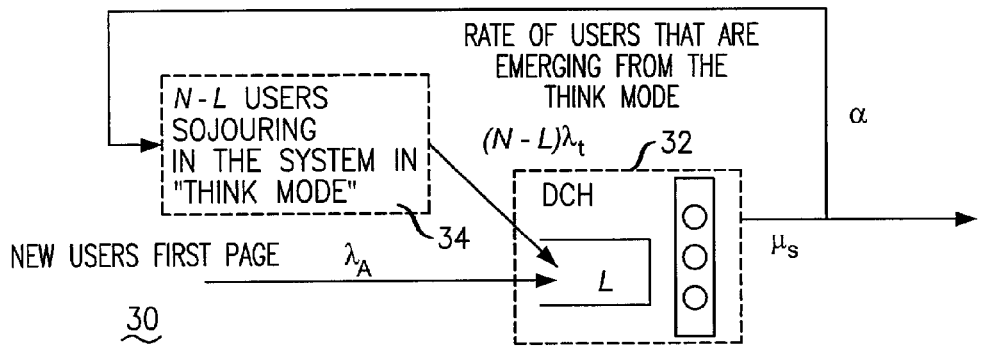
FIG. 4 shows an analytical model for a networking system.

FIG. 4 shows the analytical model 30 for the studied network. The arrival process of new users into the system is Poisson at the rate 1A. Each new user begins by downloading a page and is thus placed in the DCH queue 32. After a user has downloaded a page, it exits the system if it has no more pages to send. If there are more pages to send, it enters into the think time phase 34. When the think time is over, the user returns to the DCH queue 32.

In order to obtain close form expression, some simplifying assumptions are made. It is assumed that the service time per page is exponentially distributed and the think time is exponentially distributed. With these assumptions, the users in think mode can be described by an M/M/∞ queue and the DCH queue is a M/M/k queue. The system model is thus a network of quasi-reversible queues and thus has product form solution.

Note that for the modeled system to be stable $$(N-L)\lambda_t + \lambda_A = n\lambda_A$$

The page download time is simply the waiting time (i.e., sum of the queuing time and service time) in a M/M/k queue with arrival rate $n\lambda_A$. Let d denote the time elapsed from the time the user moves into the DCH queue to the time that the user finishes downloading the page and returns to the think time phase. Then the sojourn time of a user in the system is given by $$T = nd + (n-1)\lambda_t$$

Using Little's law we can obtain the number of sojourning users in the system as $$N = T/\lambda_A$$

Figure 5:
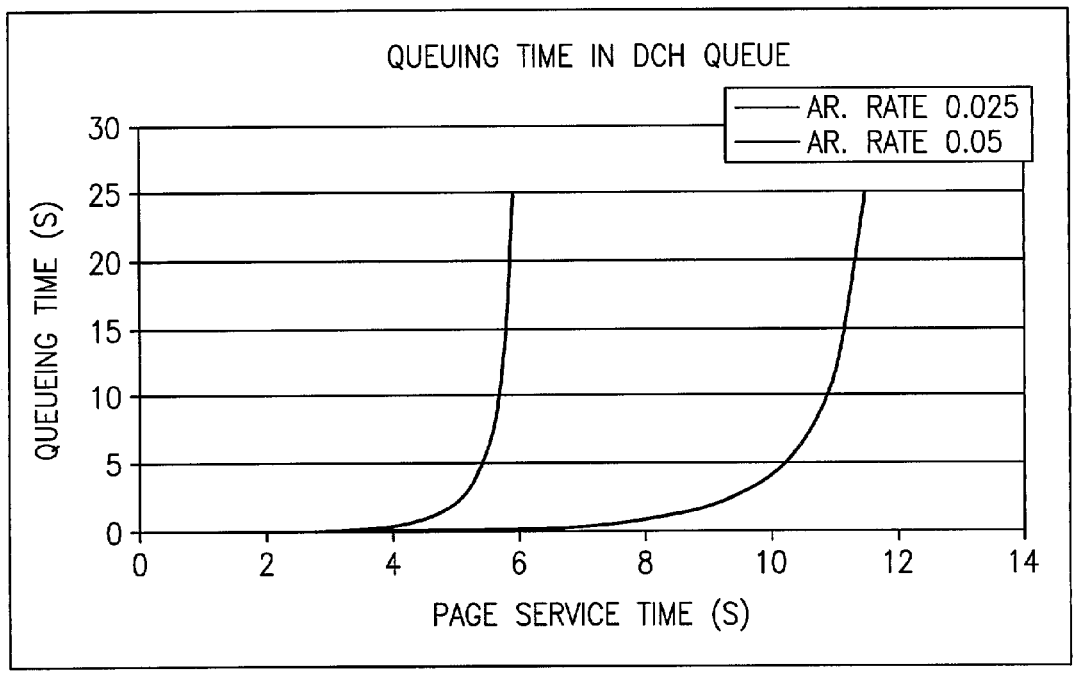
FIG. 5 shows a plot of queuing time in a DCH queue for different arrival rates.
Figure 6:
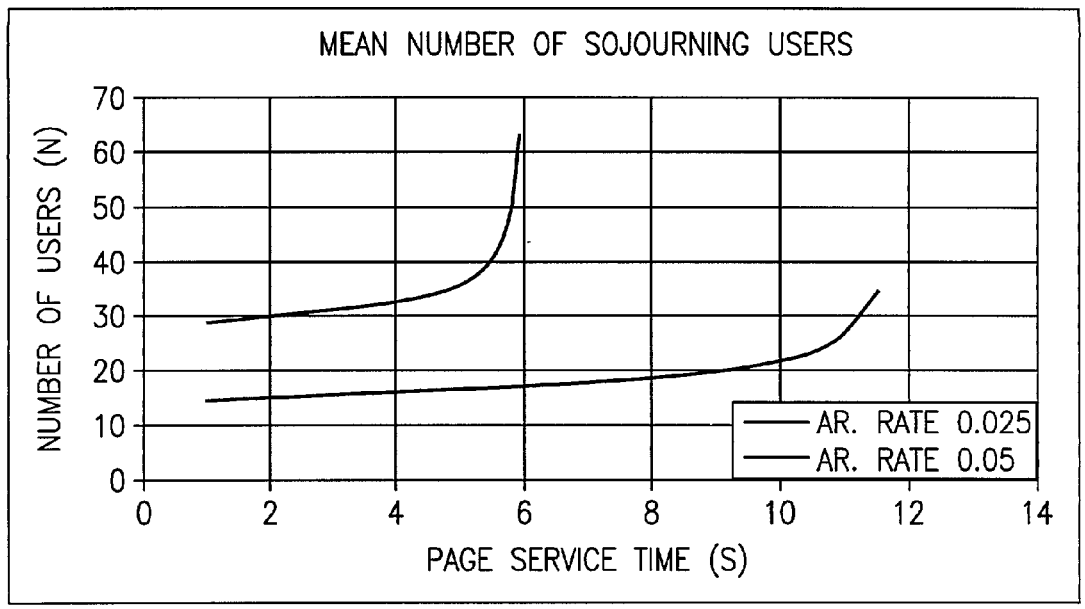
FIG. 6 shows a plot of the mean number of sojourning users for different arrival rates.

FIG. 5 shows the time taken to obtain the DCH, i.e., the queueing time at the DCH queue, as a function of page service time for user arrival rate of 0.025 (42) and 0.05 (44) with each user having a mean of 23 pages. The page download time is the sum of the queueing timer and page service time. Based on the queueing delay in the DCH queue and the page service time, the number of sojourning users is calculated using Little's law. The values obtained are plotted in FIG. 6 for user arrival rate of 0.025 (52) and 0.05 (54), respectively.

The use of the term "page service time" can be somewhat misleading when applying these results to the actual system. In developing the model that we have implicitly assumed that the time a user holds on to a "DCH server" in the DCH queue is the page service time, i.e. the time taken to download a page after a DCH is acquired. However, in the real system the actual time taken to download a page may be quite different from the time that a user holds on to a DCH.

For example, for the FIT algorithm the code is released only after the inactivity timer expires, hence the time a user holds on to a DCH is the sum of the page download time and the inactivity timer threshold. Thus in applying these results to the studies of algorithms, we must consider the DCH holding time instead of the page service time and the queueing time is equivalent to the waiting time for DCH to be allocated.

Power Allocation for Users in DCH State

Figure 7:
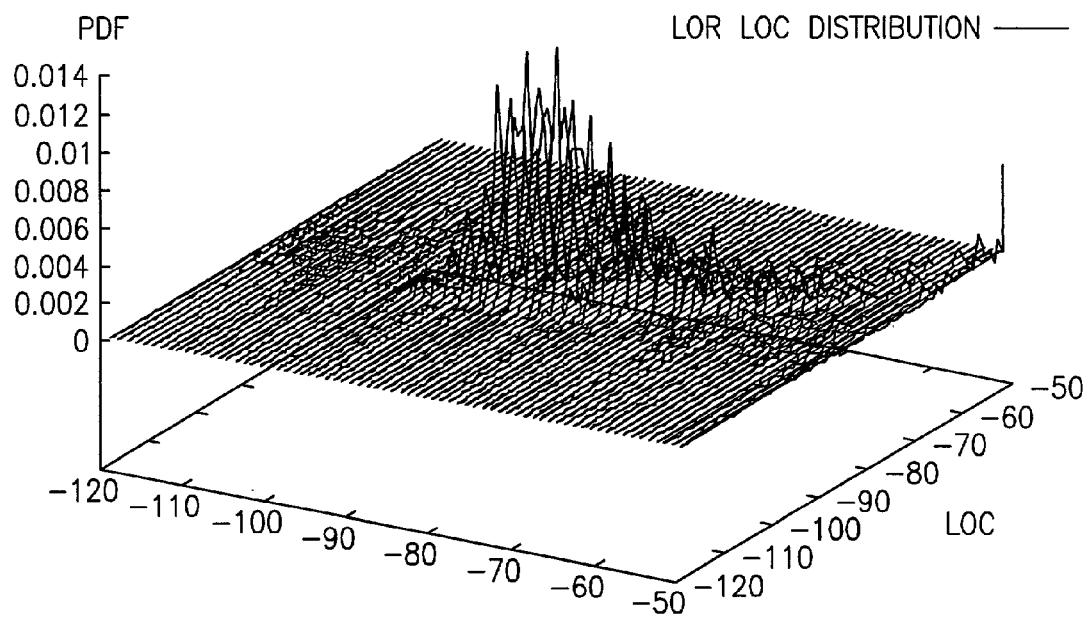
FIG. 7 shows a plot of a Joint Ior, Ioc distribution.

The power allocated to a user is updated at regular intervals. The required power allocation is based on an empirical joint distribution of Ior (power received by a user from its own sector) and Ioc (power received by the user form other sectors) that was obtained from field tests. The empirical distribution is shown in FIG. 7. Using this joint distribution, the unconditional distribution of Ior and the conditional distribution of Ioc given Ior is obtained.

When a new user arrives, a value of Ior is chosen for the user (based on the unconditional distribution of Ior). This value of Ior remains unchanged for the user throughout the simulation. At the power update interval, a value of Ioc is chosen using the conditional distribution of Ioc given Ior. The power allocation is based on the ratio (Ior/Ioc) and the data rates of the user. If a user cannot be allocated its maximum data rate due to power limitations, an attempt is made to allocate a lower bandwidth, i.e., if a user cannot be allocated 384 Kb/s, then an attempt is made to allocate power for 128 Kb/s and so on. If the available power cannot satisfy the requirements of the user's permitted data rates, the user rate is dropped to zero.

One of the parameter reported in the simulation study is the mean downlink power usage across all users. In calculating the downlink power usage for the user, we assume that a user consumes its full power allocation during TTIs where it sends data and 10% of allocated power in TTIs where no data is sent.

LRU and Fixed Inactivity Timer (FIT) Implementation

For the FIT and LRU algorithms, decisions for switching users are made periodically at intervals of 200 ms. The power requirements for the DCHs are also updated at these epochs.

In order to determine which users are eligible for switching from Cell_FACH to Cell_DCH state in the FIT and LRU algorithms, the following criteria are used. Let n denote an index on the switch epochs. Define $u_n$: Number of uplink RLC PDUs between update n and n+1

$d_n$: Number of downlink RLC PDUs between update n and n+1

$q_n$: RLC Queue length (in RLC PDUs) at the $n^{th}$ update epoch $x_n+1=q_n+d_n+u_n$ xn+1 is the measurement used for determining user activity. If $x_n+1>10$ for a user in Cell_FACH, then the user is eligible for changing state to Cell_DCH.

For the exemplary FIT algorithm, the inactivity timer threshold used is 3.5 sec. If a user's inactivity time is greater than 3.5 s, then the user's DCH is released. For the LRU algorithm, the user whose inactivity timer is the largest is released if there are users in Cell_FACH waiting for a DCH. In order to prevent excessive switching in the LRU due to short intervals of zero buffer, it is required that a user buffer should be empty for at least 100 ms. In addition, for both algorithms, it is also required that a user remains for at least 1.0 s in a state before being eligible to switch to another state. The time required for switching between states is 0.5 s.

In the combined algorithm FIT and LRU algorithm (termed FIT+LRU), the DCH is released if the user has been inactive for 3.5 s. However, if all DCHs are assigned to users and new user requires one, then the LRU approach is used to determine which user must be transitioned to Cell_FACH.

Adaptive Algorithm

For the adaptive algorithm a switching decision is made every 200 ms. We also require that a user must remain in a given state for at least 1.0 s before being eligible to switch to another state.

The most critical issue in the implementation of the adaptive algorithm is the choice of the tuning parameters, a, $\alpha$, $\beta$. These parameters directly impact the time taken to detect the beginning of a new page and the end of the page download. In general, the parameter $\beta$ is chosen so that traffic flows with largely spaced short bursts of small packets do not trigger a transition from FACH to DCH. The parameter $\alpha$ is chosen to reflect the desired lower bound on occupancy of the DCH. Clearly, the value of a, $\alpha$, $\beta$ depends on the measurement update epoch. Guidelines for the choice of the measurement update epoch are not provided since it depends on the available processing power. A technique is presented for determining a, $\alpha$, $\beta$ given the update interval.

Figure 8:
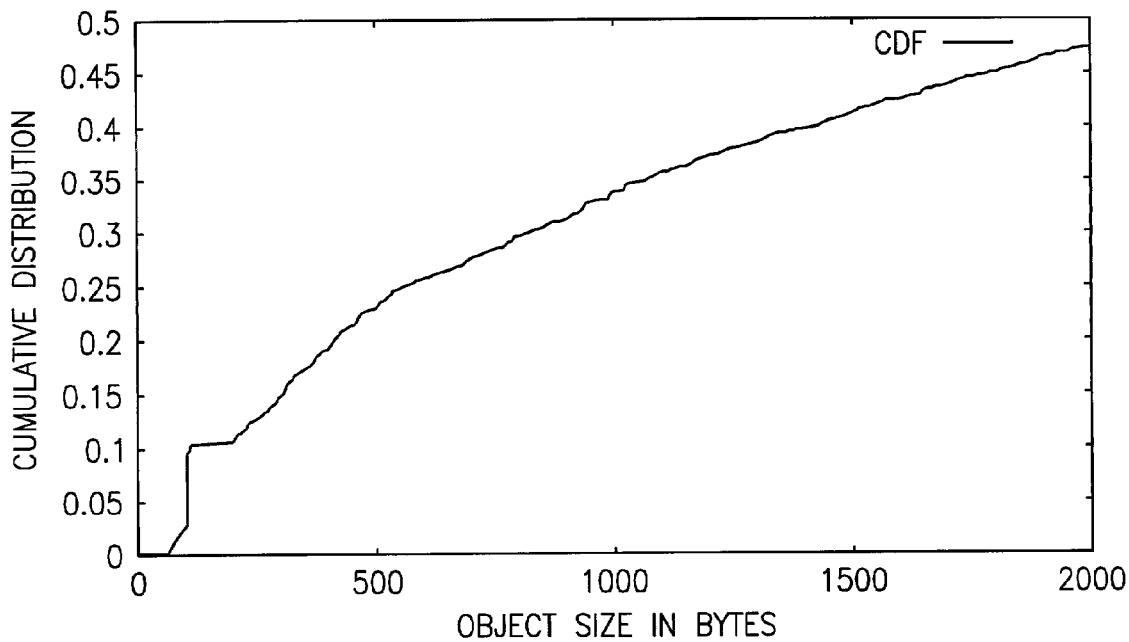
FIG. 8 shows a plot of a distribution of object sizes.

The first parameter to be set is $\beta$. Choose $\beta$ so that most of the objects in a page are larger than b. In the simulation experiment, we chose $\beta$ using the distribution of object sizes. A partial plot of the empirical distribution of object sizes is shown in FIG. 8.

We use $\beta=400$ bytes (10 PDUs), since 75% of object sizes are larger than 400 bytes. The parameter a is chosen so that the detection of pages with first object size greater than 400 bytes (75% of downloaded pages) takes place with in 0.5 s. If an update takes place every t sec, then the adaptive algorithm emulates an RC filter with time constant $$\frac{at}{1-a}$$

We choose a so that the detection so that the desired response time, say 0.5 seconds, is 5 times the time constant.

$$5 \times \frac{at}{1-a} = 0.5$$

The criterion used to determine whether a user is to be switched from DCH is FACH is that its estimated bandwidth requirement should be less than 1/10th of the FACH bandwidth (f), i.e., $$\frac{y_n * 320}{t} \leq \frac{f}{10}$$

$$\alpha = \frac{ft}{3200}$$

In the simulation studies, two different update intervals were considered, 1 TTI (20 ms) and 5 TTI. The FACH data rate was 32 Kb/s. The values of a, $\alpha$, $\beta$ are given in the table.

When the algorithm is applied in networks whose backhaul delay has high jitter it may be more useful to choose the parameter a based on the delay statistics. One such method would be to make the time constant, i.e. (a/1−a) a linear function of the mean delay.

Simulation Results

Two sets of simulation results are presented. A first set is for the low load case. The second case is for the high load case.

Low load simulation results

The user arrival rate was set to 0.025, i.e. 1 arrival every 40 s. The web browsing session parameters for each user is given in Table 1. The results presented are for a single run with simulated time of 40000 s.

Figure 9:
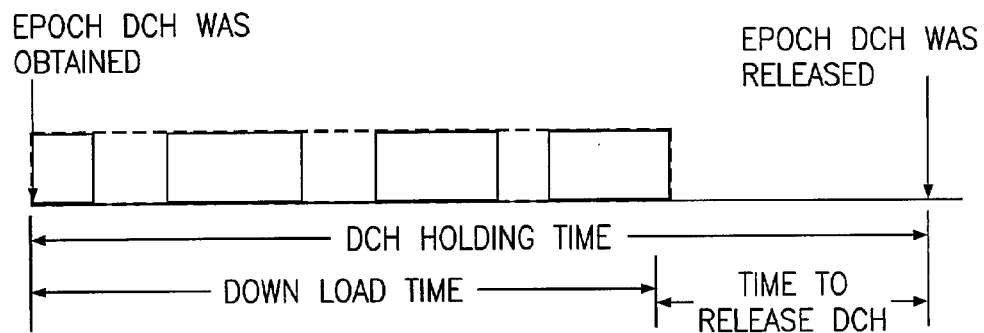
FIG. 9 shows DCH holding time statistics.

The DCH holding time statistics are given in Table 3. An illustrative explanation of the parameters is shown in FIG. 9. For the FIT and adaptive algorithms, the inverse of the DCH holding time is precisely the rate at which DCH's are available for new users. The results show that the mean holding time is no more that 7.0 s. Given a DCH holding time of 7.0 s, the analytical study presented in section 3.2 (see FIG. 4) predicts that negligible queueing delay is incurred in obtaining a DCH.

Other statistics collected are given in Table 4. The page download time for the LRU, FIT and FIT+LRU are quite close. This is to be expected since there is no queueing delay incurred in obtaining a DCH for these algorithms and the criterion for switching to DCH (i.e. threshold of 10 PDUs) is the same for the three algorithms. The page download time for the adaptive algorithms is slightly higher due to the extra time it takes the filtered quantity to rise to the switching threshold.

Note that the power used for the LRU algorithm is quite high. This happens due to the extended holding time of the DCH for the LRU algorithm. The extending holding time on the DCH may also cause excessive power consumption at the user equipment (UE). However, the number of switches between FACH and DCH state is least for the LRU algorithm, this might be an advantage in cases of limited processing capacity. The power utilization can be improved by the FIT+LRU approach. Among the four algorithms studied, the adaptive algorithm with 5 TTI update and the FIT+LRU approach appear promising.

High Load Simulation Results

The user arrival rate was set to 0.05, i.e. 1 arrival every 20 s. The web browsing session parameters for each user is given in Table 1. The results presented are for a single run with simulated time of 40000 s.

Figure 10:
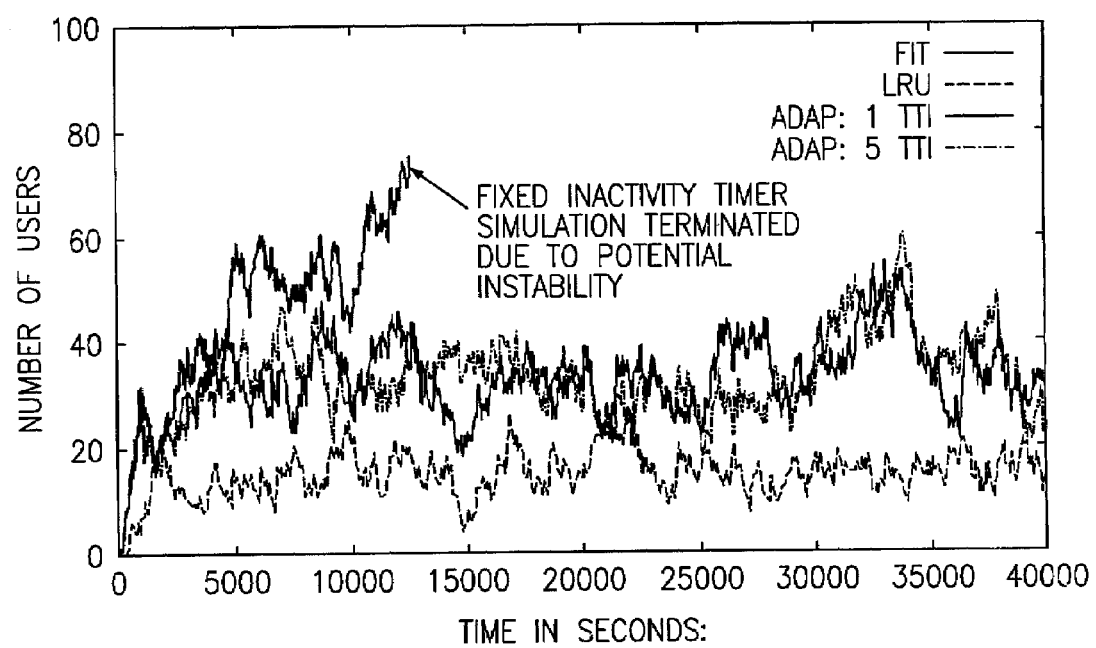
FIG. 10 shows a plot of a Joint Ior, Ioc distribution.

The DCH holding time statistics are presented in Table 5. For an explanation of the parameters see FIG. 9. In the analytic study presented in Section 3.2, we predict that the waiting time for obtaining a DCH can be high when the DCH holding time is greater than 5 seconds. Note that the DCH holding time is independent of the session arrival process for the FIT algorithm. In the experiment with arrival rate of 0.025, the DCH holding time for the FIT algorithm was observed to be 7 seconds which is considerably higher than the analytically predicted limit of 5 sec (for an arrival rate of 0.05). Thus in the FIT experiment with rate 0.05, the 7 s value of DCH holding time causes a high waiting time to obtain a DCH. The increased waiting time causes rapid build up in the number of user sojourning in the system. This phenomena was observed for the FIT simulation and the experiment had to be prematurely terminated. The evolution of the number of sojourning users is shown in FIG. 10.

The LRU algorithm and adaptive algorithms have shown to perform quite well for this case. Note that the stable performance of the adaptive algorithm is because the parameters of the adaptive algorithm were chosen so that the detection of a page start and finish occurs within a short time. The FIT+LRU algorithm overcomes the high DCH holding time limitation of the pure FIT approach. Thus a stable performance for the FIT+LRU algorithm is observed.

The page download times for all the algorithms was observed to be slightly higher than the page download times observed for the case where the arrival rate was 0.025. This increased download time is due to the extra waiting time incurred in obtaining the DCH. The analytical model in predicts this fact.

From the results, it can be seen that the power consumed by the LRU algorithm is still the highest, when compared with the adaptive algorithm. However, the difference in power usage between the LRU approach and the adaptive algorithms is fairly small since DCH holding times are cut short by the increased arrival rate. The increased arrival rates forces DCH users to give up their DCHs faster. The number of switches per page is smallest for the LRU algorithm. The FIT+LRU approach provides better power utilization than the pure LRU approach.

The performance of various dynamic DCH allocation algorithms in UMTS networks has been described. The algorithms have been studied for the case where all users conduct web browsing sessions. An analytical model that can be used to determine page download delays was also disclosed. Four algorithms: FIT,LRU, FIT+LRU and Adaptive, were specifically disclosed. A method for setting the parameters for the Adaptive algorithm using the page object size statistics, update interval and desired delay was also presented.

Under low load conditions, the user perceived page download times of all the algorithms are small. However, under high load conditions, the FIT approach can have instability problems (causing excessive page download delays) due to excessive DCH holding times. This limitation of the FIT algorithm may be overcome by choosing a smaller inactivity timer threshold or by using the combined FIT+LRU algorithm.

The power consumption of the LRU algorithm was found to be the highest among all the approaches. However the combined FIT+LRU algorithm was shown to alleviate this problem. The adaptive algorithms perform well if the filter coefficients and thresholds are chosen properly. However, due to the sensitivity of these parameters to traffic statistics, the choice of a set of parameters that would work for all traffic types may not be easy.

As discussed previously, the dynamic DCH algorithms may also be applied toward other wireless systems. In a 3G1X system, an active data session will be given a fundamental channel. When the RLP buffer occupancy exceeds certain thresholds, the user will be allocated supplementary channel bandwidth. The allocated rates will be dependent on the buffer occupancy as well as power availability. When the buffer is empty, an inactivity timer will be triggered. When the timer expires, the fundamental channel will be released and the user put in dormant mode.

When a chatty application such as keep alive messages is present, the inactivity timer doesn't expire even though there is no useful user activity. Thus, resources are not well utilized.

An alternate method based on measurements of required data rate may improve bandwidth utilization. Here, we periodically estimate the following parameters:

Record the queue length at the beginning of an interval $q\_\{n-1\}$—queue length at the beginning of the interval n:

At the end of the interval we record the number of arrivals $d\_n$–number of downlink arrivals during the interval.

Let $x\_n = d\_n + q\_n - 1$

Filter the parameter $x\_n$ using a simple exponential averaging filter:

$y\_n = a*y\_\{n-1\} + (1-a)*x\_n$

Choose two thresholds $\alpha$ and $\beta$

```
if (y_n > β && the user is in dormant state)
    switch the user to active state
else if (y_n < α && the user is in active state)
    switch the user to dormant state.
```

The parameter "a" provides us a handle on how responsive the system needs to be to arrivals or phases of idleness. In addition the parameter beta ($\beta$) can be chosen so that a user does not switch to active mode too often when a small packet arrives. The parameter alpha ($\alpha$) can be used to set a lower bound on the code utilization in Cell_DCH mode.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

TABLE 1

Statistics of web browsing session

| | |
|---|---|
| No. of objects | Empircal [3] Mean ≈ 5 |
| Size of each object | Empirical [3] Mean ≈ 7 KB |
| Page size | Approx 35 KB (from no. of objects * size of objects) |
| Think time | Exponential: Mean 25s |
| No. of Pages downloaded | Exponential: Mean 23 |

TABLE 2

Parameters for the adaptive algorithm simulation experiments

| Update Interval | a | $\alpha$ | $\beta$ |
|---|---|---|---|
| 1 TTI | 0.84 | 0.2 | 10 PDU |
| 5 TTI | 0.5 | 1.0 | 10 PDU |

TABLE 3

DCH Holding time and associated measurements for inter-arrival time of 40s. All figures are mean values.

| Algorithm | DCH Holding Time | Time to Release DCH | Total time Buffer > 0 during Download time | Total time Buffer = 0 during Download time |
|---|---|---|---|---|
| Fixed Inactivity Timer (3.5 s) | 7 | 3.51 | 1.22 | 2.27 |
| LRU | 19.27 | 10.21 | 1.73 | 7.33 |
| Adaptive (1 TTI) | 3.92 | 1.02 | 1.12 | 1.78 |
| Adaptive (5 TTI) | 4 | 1.09 | 1.12 | 1.79 |
| Fixed + LRU | 6.92 | 3.44 | 1.21 | 2.26 |

TABLE 4

Other observed statistics for inter arrival time of 40s. All figures reported are mean values.

| Parameter | FIT (3.5 s) | LRU | FIT + LRU | Adap: 5TTI | Adap: 1TTI |
|---|---|---|---|---|---|
| Occupancy of DCH | 8.66% | 8.76% | 8.62% | 8.36% | 8.51% |
| Allocated Bandwidth in DCH state | 383.68 | 383.74 | 383.87 | 383.91 | 383.98 |
| Power Used (dB) | −21.10 | −19.89 | −21.23 | −21.46 | −21.35 |
| Av. No. of switches per page | 1.65 | 1.21 | | 1.77 | 1.76 |
| Mean page download time | 3.87 | 3.73 | 3.73 | 4.16 | 4.25 |
| Number of Pages Sent per completed user | 23.02 | 22.21 | 22.5 | 21.77 | 22.35 |
| Number of users completely served | 981.00 | 980.00 | 983 | 979.00 | 977.00 |

TABLE 4-continued

Other observed statistics for inter arrival time of 40s. All figures reported are mean values.

| Parameter | FIT (3.5 s) | LRU | FIT + LRU | Adap: 5TTI | Adap: 1TTI |
|---|---|---|---|---|---|
| Mean number of sojourning users | 15.65 | 15.12 | 15.32 | 14.91 | 15.38 |
| Mean page size | 36.01 KB | 35.96 KB | 36.10 KB | 36.16 KB | 35.86 KB |

TABLE 5

DCH Holding time and associated measurements for inter-arrival time of 20s. All figures are mean values.

| Algorithm | DCH Holding Time | Time to Release DCH | Total time Buffer > 0 during Page Download time | Total time Buffer = 0 during Page Download time |
|---|---|---|---|---|
| Fixed Inactivity Timer | 6.8 | 3.51 | 1.18 | 2.11 |
| LRU | 6.89 | 3.24 | 1.23 | 2.41 |
| Adaptive (1 TTI) | 3.96 | 1.02 | 1.11 | 1.84 |
| Adaptive (5 TTI) | 4.05 | 1.09 | 1.11 | 1.85 |
| Fixed + LRU | 5.82 | 2.58 | 1.17 | 2.06 |

TABLE 6

Other observed statistics for inter arrival time of 20s. All figures reported are mean values.

| Parameter | FIT (Prematurely Terminated) | LRU | Adap: 5TTI | Adap: 1TTI | FIT + LRU |
|---|---|---|---|---|---|
| Occupancy of DCH | 14.63% | 17.63% | 17.19% | 17.53% | 16.62% |
| Allocated Bandwidth in DCH state | 383.81 | 383.09 | 383.40 | 383.68 | 383.60 |
| Power Used(dB) | −23.96 | −17.99 | −18.47 | −18.40 | −18.51 |
| Av. No. of switches per page | 1.53 | 1.64 | 1.75 | 1.77 | |
| Mean page download time | 9.70 | 4.15 | 5.64 | 5.13 | 4.07 |
| Number of Pages Sent per completed user | 20.68 | 22.6 | 22.82 | 23.09 | 21.77 |
| Number of users completely served | 567 | 1970 | 1968 | 1966 | 1966 |
| Mean number of sojourning users | 46.26 | 31.53 | 33.13 | 33.33 | 29.97 |
| Mean page size | 35.68 KB | 35.86 KB | 35.79 KB | 35.84 KB | 35.78 KB |

What is claimed is:

1. A method of allocating user channels for packet data services in a wireless communications network, a first type channel having a given data rate and a second type channel having a lower data rate, comprising the steps of:
    determining an estimated bandwidth requirement for said packet data services;
    switching a user to said second channel type from said first channel type if said estimated bandwidth requirement is below a first threshold; and
    switching a user to said first channel type from said second channel type if said estimated bandwidth requirement is greater than a second threshold
    wherein said estimated bandwidth requirement is based on the number of uplink and downlink data units in a given interval and queue length of an associated buffer,
    wherein said estimated bandwidth requirement is filtered and said filter emulates a low pass filter.

2. The method of claim 1, wherein switching to said first channel type from said second channel type occurs only if said first channel type is available.

3. A method of allocating user channels for packet data services in a wireless communications network, a first type channel having a given data rate and a second type channel having a lower data rate, comprising the steps of:
    determining an estimated bandwidth requirement for said packet data services;
    switching a user to said second channel type from said first channel type if said estimated bandwidth requirement is below a first threshold; and
    switching a user to said first channel type from said second channel type if said estimated bandwidth requirement is greater than a second threshold, wherein said estimated bandwidth requirement is based on the number of downlink arrivals during a given interval and queue length of an associated buffer at the beginning of the interval.

4. The method of claim 3, wherein switching to said first channel type from said second channel type occurs only if said first channel type is available.

5. The method of claim 3, wherein said estimated bandwidth requirement is further filtered.

6. The method of claim 3, wherein said filtered estimated bandwidth requirement is an exponential averaging filter.

7. The method of claim 3, wherein said first type channels are selected from the group consisting of dedicated channels and active state channels and wherein said second type channels are selected from the group consisting of forward access channels and dormant state channels.

8. A method of allocating user channels for packet data services in a wireless communications network, a first type channel having a given data rate and a second type channel having a lower data rate, comprising the steps of:

determining an estimated bandwidth requirement for said packet data services;

switching a user to said second channel type from said first channel type if said estimated bandwidth requirement is below a first threshold; and switching a user to said first channel type from said second channel type if said estimated bandwidth requirement is greater than a second threshold, wherein said second threshold is based on a proportion of downloadable object sizes.

9. A method of allocating user channels for packet data services in a wireless communications network, a first type channel having a given data rate and a second type channel having a lower data rate, comprising the steps of:

determining an estimated bandwidth requirement for said packet data services;

switching a user to said second channel type from said first channel type if said estimated bandwidth requirement is below a first threshold; and switching a user to said first channel type from said second channel type if said estimated bandwidth requirement is greater than a second threshold, wherein said first threshold value is chosen to minimize transitions from FACH to DCH from packet bursts.

10. A method of allocating user channels for packet data services in a wireless communications network, a first type channel having a given data rate and a second type channel having a lower data rate, comprising the steps of:

determining an estimated bandwidth requirement for said packet data services;

switching a user to said second channel type from said first channel type if said estimated bandwidth requirement is below a first threshold; and switching a user to said first channel type from said second channel type if said estimated bandwidth requirement is greater than a second threshold, wherein said second threshold is chosen to reflect a lower bound on occupancy of a DCH.

11. A method of allocating user channels for packet data services in a wireless communications network, a first type channel having a given data rate and a second type channel having a lower data rate, comprising the steps of:

providing an inactivity timer per user;

switching from said first channel type to said second channel type depending on a state of said inactivity timer wherein said step of switching takes place when said inactivity timer reaches a predetermined threshold, further including scanning the inactivity period of a number of users utilizing said first type of channel and switching a user having a highest inactivity channel to said second type channel if none of said users have reached said predetermined threshold.

12. A method of allocating user channels for packet data services in a wireless communications network, a first type channel having a given data rate and a second type channel having a lower data rate, comprising the steps of:

providing an inactivity timer per user;

switching from said first channel type to said second channel type depending on a state of said inactivity timer, wherein said step of switching further includes the step of scanning the inactivity period of a number of users utilizing said first type of channel and switching a user having a highest inactivity channel to said second type channel, wherein said step of switching takes place when said inactivity timer reaches a predetermined threshold.

* * * * *